United States Patent [19]
Schauer

[11] Patent Number: 5,509,707
[45] Date of Patent: Apr. 23, 1996

[54] ROBOTIC GRIPPER MODULE

[75] Inventor: Frank Schauer, Kitchener, Canada

[73] Assignee: 737333 Ontario Inc., Kitchener, Canada

[21] Appl. No.: 205,369

[22] Filed: Mar. 4, 1994

[51] Int. Cl.$^6$ ................................ B25J 15/10; B66C 1/42
[52] U.S. Cl. .................... 294/86.4; 294/119.1; 294/88; 901/37
[58] Field of Search ........................ 294/86.4, 86.41, 294/88, 119.1, 94, 115, 31; 901/36–39

[56] References Cited

U.S. PATENT DOCUMENTS

| | | | |
|---|---|---|---|
| 3,848,753 | 11/1974 | Borg et al. | 294/86.4 X |
| 4,456,293 | 6/1984 | Panissidi | 294/86.4 X |
| 4,765,669 | 8/1988 | Meier | 294/119.1 |
| 4,775,271 | 10/1988 | Maccaferri | 294/119.1 X |
| 4,913,481 | 4/1990 | Chin et al. | 294/119.1 X |
| 5,088,784 | 2/1992 | Foote, Jr. | 901/36 X |

FOREIGN PATENT DOCUMENTS 682366 8/1979 U.S.S.R. .................... 901/36

Primary Examiner—Dean Kramer
Attorney, Agent, or Firm—R. Craig Armstrong

[57] ABSTRACT

A robotic gripper module, which can be fitted to a robotic arm or other support, houses a rotor which is rotatable relative to the frame of the module. The rotor has at least two equiangularly positioned slots, each extending at the same relative angle to a radius of the rotor. A cam follower mounted on radially-moveable slide members is positioned in each of those slots and also in a respective radial slot in the module frame, and rotation of the rotor causes the cam followers and slide members, on which finger assemblies may be mounted, to move together radially inwardly or outwardly on the frame. An arcuate gear segment on the periphery of the rotor meshes with a gear rack on one end of a rod; the other end of the rod connects to a piston-and-cylinder actuator. In one form of the module two rotors rotate on a single axle, one on each side of the module. The two rods associated with the two rotors extend from opposite sides of the cylindrical space between the rotors, and the pair of associated actuators are positioned outside that space. This arrangement allows for a thin module with a significant space saving over other robotic modules.

20 Claims, 7 Drawing Sheets

ROBOTIC GRIPPER MODULE

BACKGROUND OF THE INVENTION

The invention relates to the field of robotics, and in particular to a gripper module that is intended to be fitted to one end of a robotic arm or other support means.

Mechanical gripper modules for robotic arms in general have suffered one or more of the disadvantages of being bulky, complicated to operate, and not easily adaptable for use in a variety of tasks. A typical gripper module is disclosed in U.S. Pat. No. 4,752,094, entitled Robot Gripper Or Hand Device and granted to G. Tabeau on Jun. 21, 1988. In that module, each of two fingers is mounted on a respective rotatable shaft in a housing. The two shafts are spaced from each other and are adapted to be rotated together in counter directions so as to move the ends of the fingers toward each other to grasp an article. Each shaft has a connected pinion with teeth which mesh with teeth on a rack of an associated piston. The pistons are pneumatically actuated, being connected in parallel to an air supply so as to move simultaneously. One drawback with the gripper module of Tabeau is that it utilizes only two fingers rotating in a single plane; it does not teach how a third or further finger might be added to better grasp an article. Another drawback compared to the module of the subject invention, to be subsequently described, is the use of a separate actuating piston for each finger, resulting in a requirement for a correspondingly larger housing.

SUMMARY OF THE INVENTION

Ideally a robotic gripper module should be as compact, simple and lightweight as possible, and be adaptable to all types of robotic arms or other support means. Compactness allows movement of the module within confined areas, whereas simplicity allows it to be rapidly serviced. Additionally, the module should be capable of being modified with minimal time and effort. The module of the subject invention has been designed with the foregoing factors in mind. In addition, and as another advantage over gripper modules similar to the one disclosed by Tabeau, the fingers of the subject module are interchangeable. Such construction allows for the rapid interchange of sets of fingers, each set being designed to match the shape of the part or contact surface to be handled. Each finger also incorporates a fitted insert that makes contact with the part being handled. The material used for the insert as well as its surface finish is based upon the delicacy of the contact surface of the part. Using inserts is advantageous in that wear is on the inserts rather than on the fingers to which they are fitted.

An additional advantage of the subject gripper module follows from radial movement of the fingers in a common plane. Each of the fingers has a straight-line sliding motion rather than the pivoting motion of Tabeau's fingers, resulting in less finger wear, more uniform holding pressure on parts of various size, and the ability to grasp parts either internally or externally.

The gripper module of the subject invention has a compactness which allows it to be used in confined areas. Two gripper mechanisms may be placed back-to-back in a single housing, such that each side of the module may grasp a different part, or the same part before and after machining. Such construction also allows for a substantial saving in weight when compared to two separate gripper modules. Conventional single-sided gripper modules are typically twice as bulky and more than twice as heavy as the double-sided version of the gripper module of this invention. One of the double-sided gripper modules can be utilized to both load and unload a part from a machining device such as a lathe. The inserts and finger assembly on one side of the module may have a different design from those on the other side, allowing a part inserted into the machining device by fingers on one side of the module to be retrieved by the fingers on the other side even after modification of the contact surface.

A further feature of the subject gripper module is a pusher plate that may be fitted to the load side of the module to sit intermediate the fingers on that side, which when actuated aids in the seating of a part in a chuck or similar workholding device, or presses a part released by the fingers out of the gripper module. This ensures that regardless of any inconsistencies in its shape the part is fully inserted. Certain applications may not require fitting a pusher plate to the module.

In one form the gripper module of the invention has a frame adapted to be fitted to an end of a robotic arm or other support means (generally movable, but conceivably stationary), and a rotor rotatably mounted on the frame. The rotor bears a series of equiangularly-spaced first slots each extending at an angle to a radius of the axis of rotation. The gripper module also includes at least two cam followers, each constrained to move in a respective first slot and also in a respective one of a series of second slots in the frame. Each second slot extends radially from a point on the frame that corresponds with the rotational axis of the rotor. Rotation of the rotor results in the cam followers associated with the rotor moving uniformly either toward or away from each other. The module also includes a first rod extending parallel to a face of the rotor proximate one edge of the rotor, and being in positive engagement with the rotor such that an axial movement of the rod results in rotation of the rotor. A first actuator positioned outside of the periphery of the rotor creates the axial movement of the first rod. Actuation of the first actuator results in rotation of the rotor and in radial movement of the cam followers associated with the rotor.

The rod may have a gear rack engaging a gear segment extending on the face of the rotor. The actuator may be a pneumatic piston-and-cylinder. Either two or three cam followers, or more depending on and corresponding to the number of fingers, may be associated with the rotor.

This form of the gripper module may also comprise a second rod and a second actuator. The second rod extends parallel to the first rod, and is positioned proximate a diametrically-opposite edge of the rotor from the first rod. In a similar manner to the first rod, the second rod has a positive engagement with the rotor and axial movement of the second rod results in rotation of the rotor. The second actuator is positioned outside of the periphery of the rotor similar to the first actuator, and creates the axial movement of the second rod. In this arrangement, actuation of either the first or second actuators results in rotation of the rotor and in radial movement of the cam followers associated with the rotor.

In a second form the gripper module of the invention includes a frame adapted to be fitted to an end of a robotic arm or other support means, and a pair of rotors rotatably mounted on the frame. The pair of rotors extend in parallel on opposite sides of the frame. Each rotor is rotatable on a respective axis and bears a series of equiangularly-spaced first slots each extending at an angle to a radius of the respective axis. The gripper module also includes at least two cam followers. Each follower is constrained to move in a respective first slot and also in a respective one of a series of second slots in the frame. Each second slot extends radially from a point on the frame that corresponds with the rotational axis of a respective one of the rotors. Rotation of the rotor results in the cam followers associated with that rotor moving uniformly either toward or away from each other. The module also includes a pair of rods and a pair of actuators. Each rod extends into an opposite side of the space between the rotors and is in positive engagement with a respective one of the rotors, such that axial movement of a rod results in rotation of the respective rotor. Each of the actuators is positioned outside of the space between the rotors and actuates a respective one of the rods. Actuation of an actuator results in rotation of the rotor associated with that actuator, and in radial movement of the cam followers associated with that rotor.

The rotors may be rotatable on a common axis, and each rod may be positioned approximately equidistant from both rotors. The width of each actuator may be approximately equal to the distance between an outer face of one rotor and an outer face of the other rotor. Each rod may have a gear rack that engages a gear segment that extends on an inner face of the respective rotor. Each actuator may be a pneumatic piston-and-cylinder. Either two or three cam followers, or more depending on and corresponding to the number of fingers, may be associated with each rotor.

BRIEF DESCRIPTION OF THE DRAWINGS

The invention will next be described in terms of a preferred embodiment, utilizing the accompanying drawings, in which.

DETAILED DESCRIPTION OF THE PREFERRED EMBODIMENTS

Figure 1:
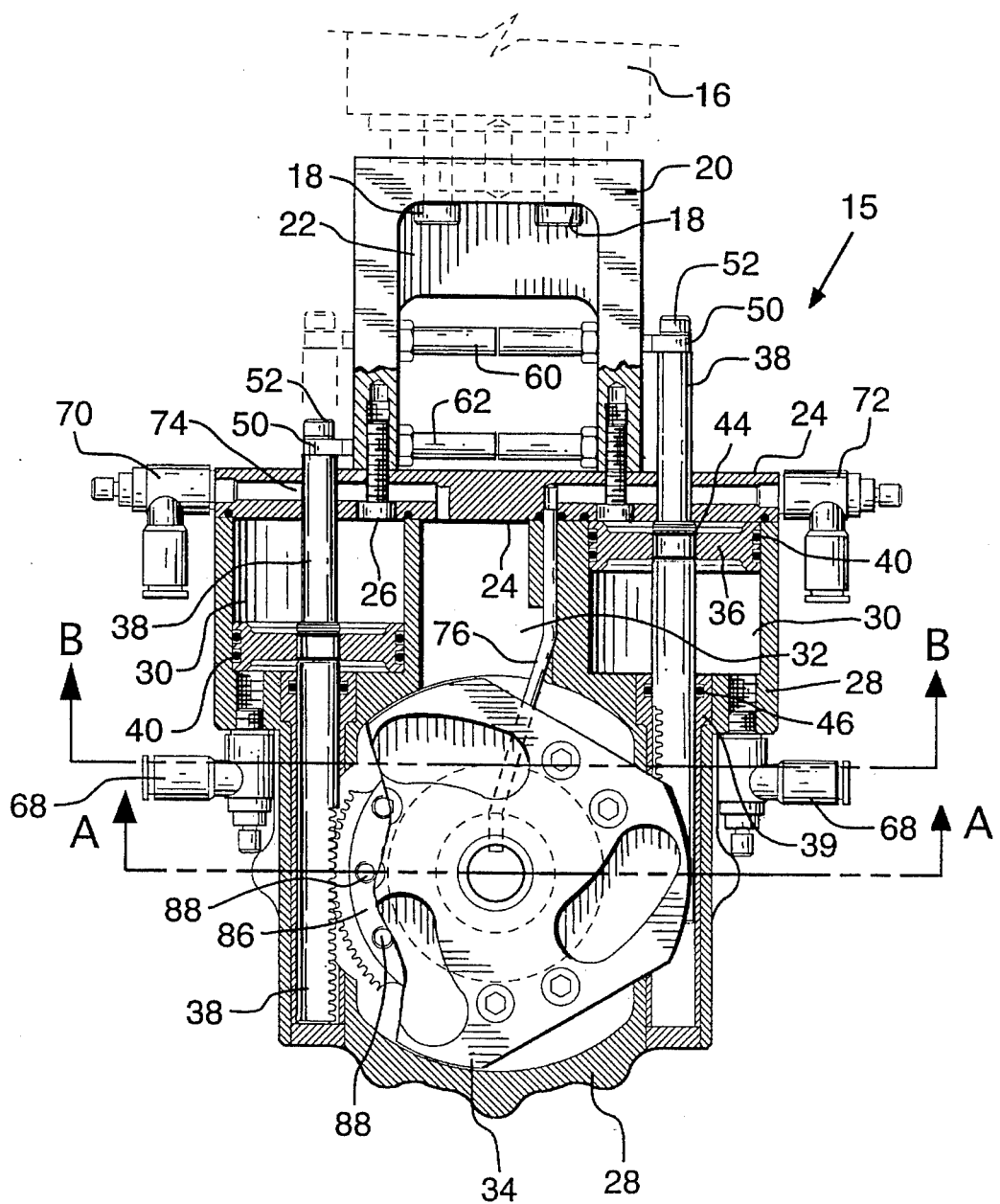
FIG. 1 is a sectioned front view of a first embodiment of the gripper module of the invention, the first embodiment having a gripper on each side, with three cam followers.
Figure 2:
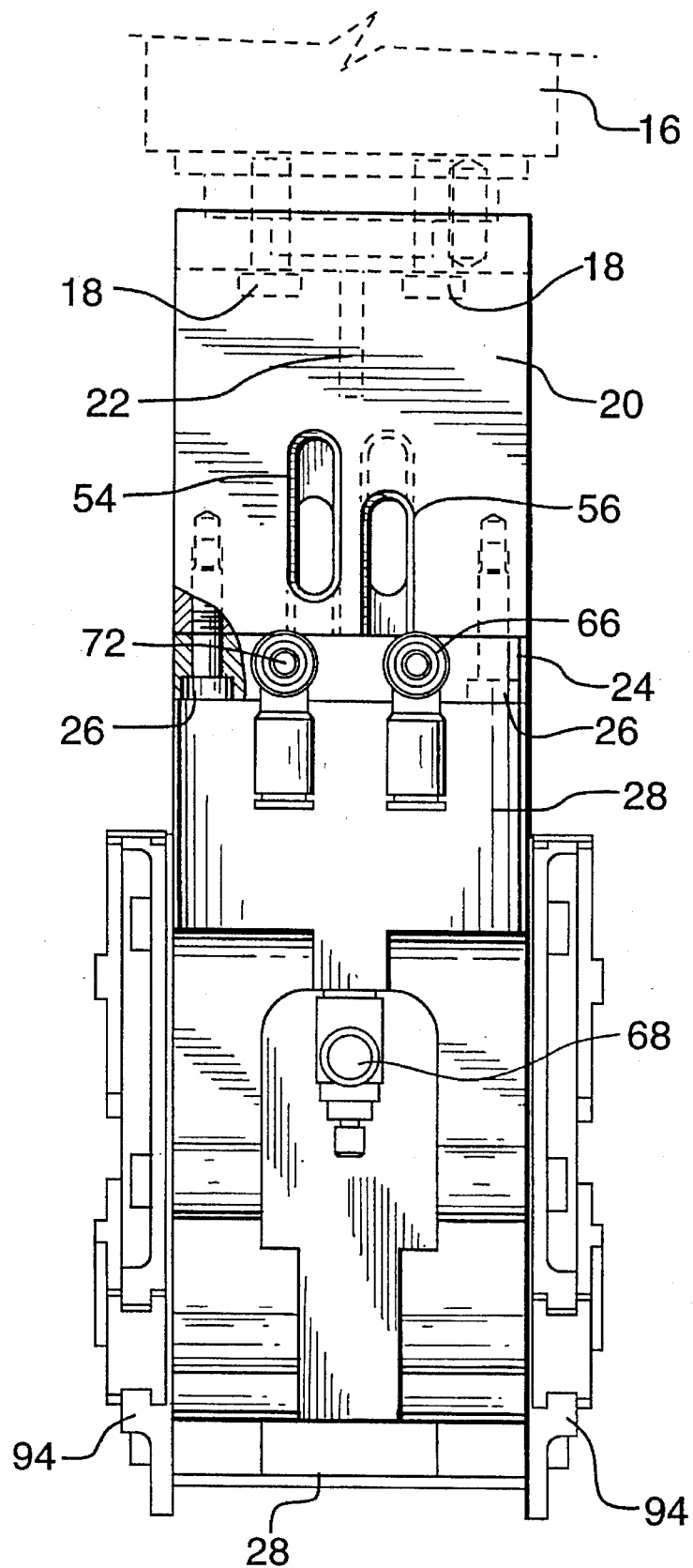
FIG. 2 is a side view of the first embodiment of the gripper module.
Figure 3:
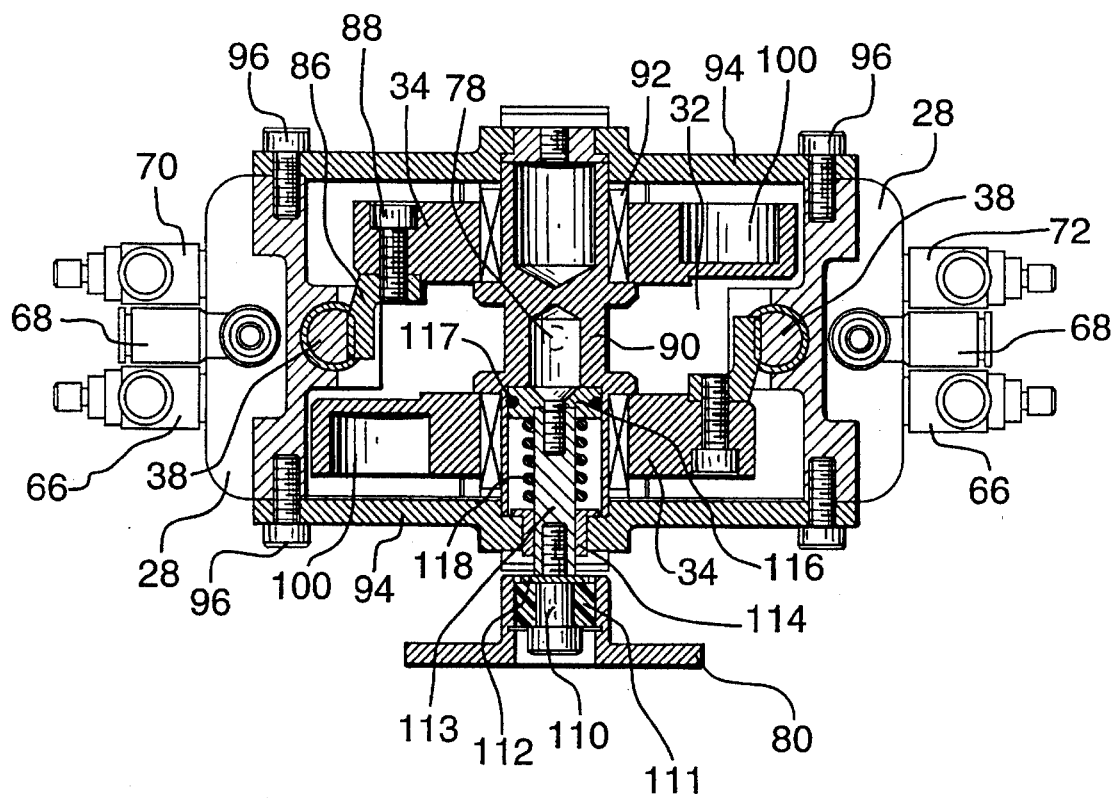
FIG. 3 is a first cross-sectional view of the first embodiment of the gripper module, the view being taken on the line "A—A" in FIG. 1.

As illustrated in FIGS. 1 and 2, an aluminum gripper module generally designated 15 is connected to a robotic arm 16, or other support means, by a series of screws 18. The gripper module 15 has an arched adapter plate 20 with a pair of legs connected by an integral central web 22. The screws 18 extend through holes on either side of web 22 in the base of adapter plate 20. A base plate 24 is fastened to the ends of the legs of adapter plate 20 by a series of screws 26. A body housing 28 is in turn secured to base plate 24. Body housing 28, which is machined from aluminum, has a pair of cylindrical cavities 30 and a larger central cavity 32. Cavity 32 is in part defined by a cylindrical aperture extending normal to the cavities 30 and adapted to house a pair of rotors 34.

Each of the cylindrical cavities 30 houses a piston 36 through which extends a rod 38. Each of the rods 38 also extends through an aperture in base plate 24 and a bushing 39 mounted in body housing 28. Around the circumference of each piston 36 is mounted a pair of O-rings 40. An O-ring 44 seals each rod 38 from the base plate 24, and an O-ring 46 seals each rod 38 from the bushing 39 in body housing 28. To the upper end of each rod 38 a sensor flag 50 is secured by a screw 52, as seen in FIGS. 1 and 2. Each sensor flag 50 extends normal to the axis of rod 38 and across a pair of slots 54 and 56 in each leg of adapter plate 20. A pair of proximity sensors 60 and 62 are mounted between the legs of adapter plate 20 to face out of the slots 54 and 56, respectively. The sensors sense when a respective rod 38 reaches the positions corresponding to the gripper being either open or closed. It is not always necessary to sense the position of the rods 38, and in such case the sensor flag 50 and sensors 60 and 62 are not used.

Each of the pistons 36 is independently pneumatically actuated, with air alternately entering each cylindrical cavity 30 through a pair of flow control valves 66 and 68. Additionally, there are two other flow control valves 70 and 72, each mounted on a respective opposite side of gripper module 15. Flow control valve 70 is connected by a flow channel 74 to the central cavity 32, while flow control valve 72 is connected through a tube 76 to a cylindrical chamber 78 for actuating a pusher plate 80, as will be subsequently further described.

Figure 4:
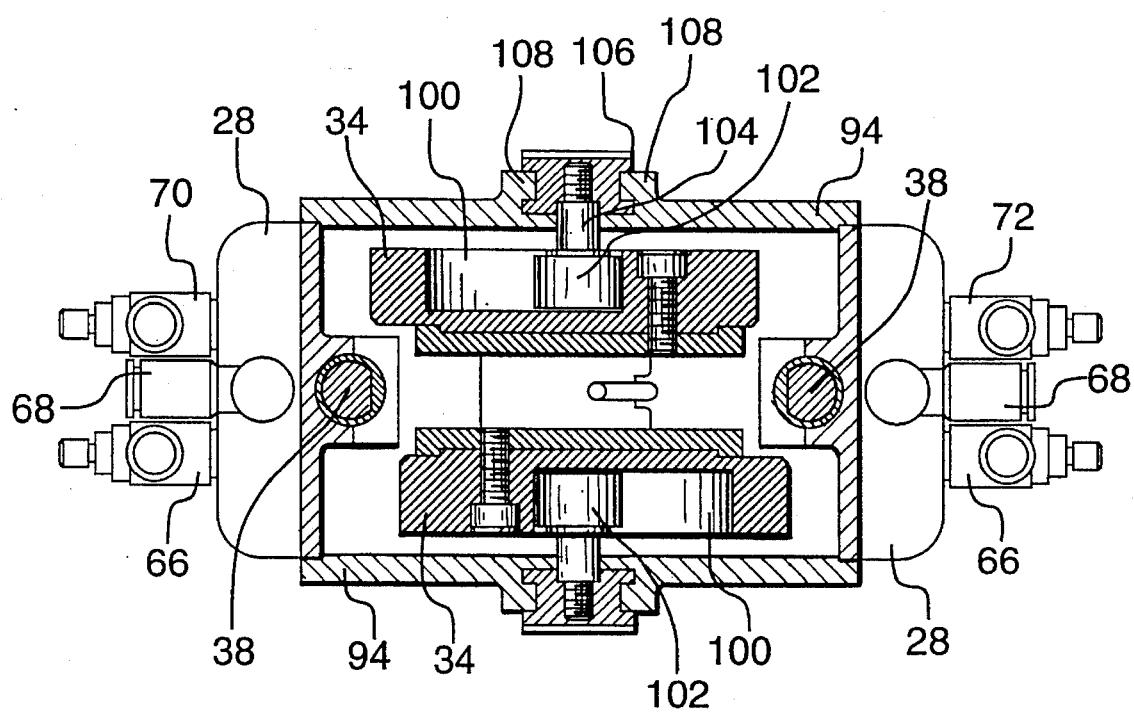
FIG. 4 is a second cross-sectional view of the first embodiment of the gripper module, the view being taken on the line "B—B" in FIG. 1.
Figure 5:
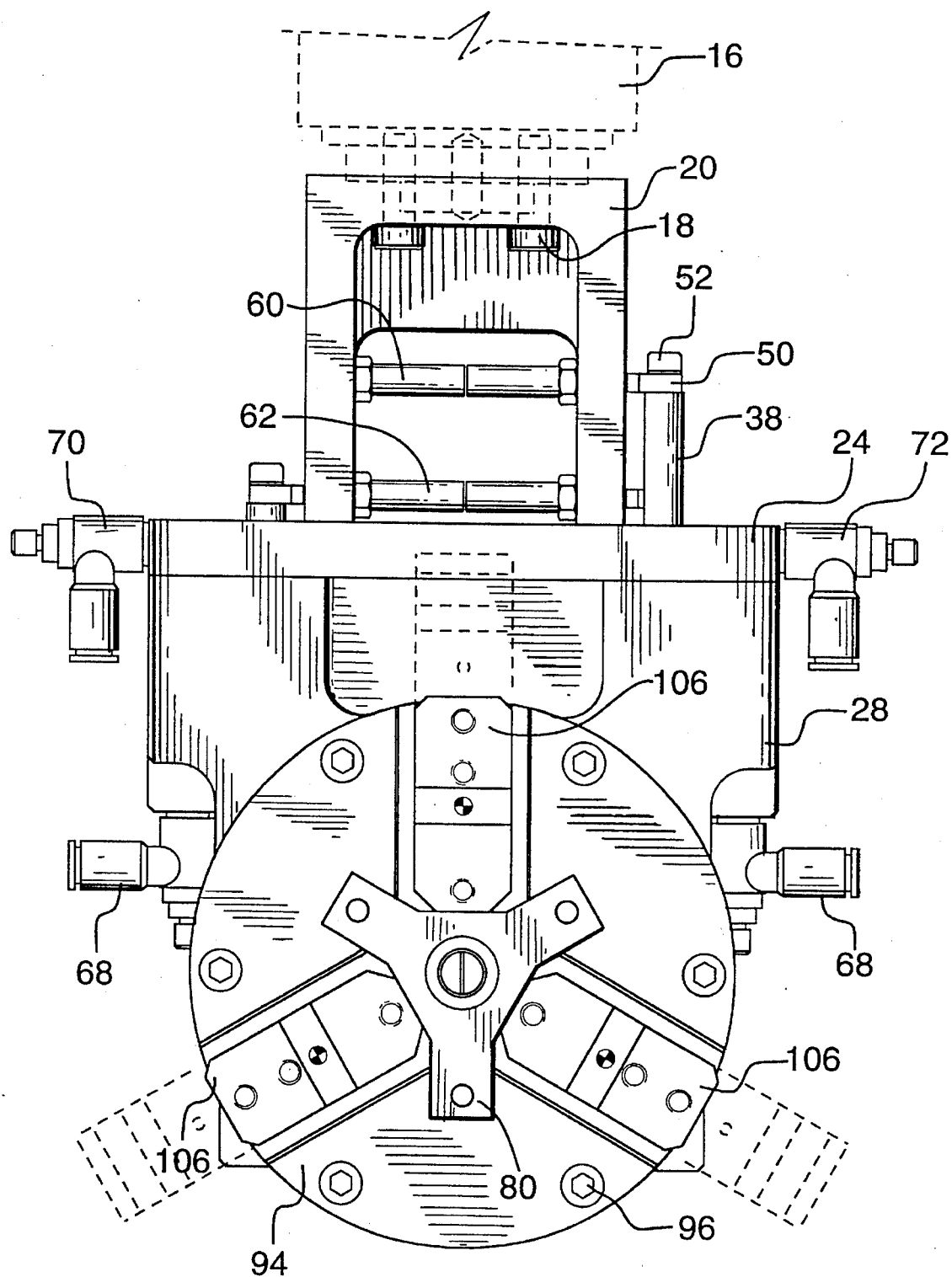
FIG. 5 is a front view of the first embodiment of the gripper module.
Figure 6:
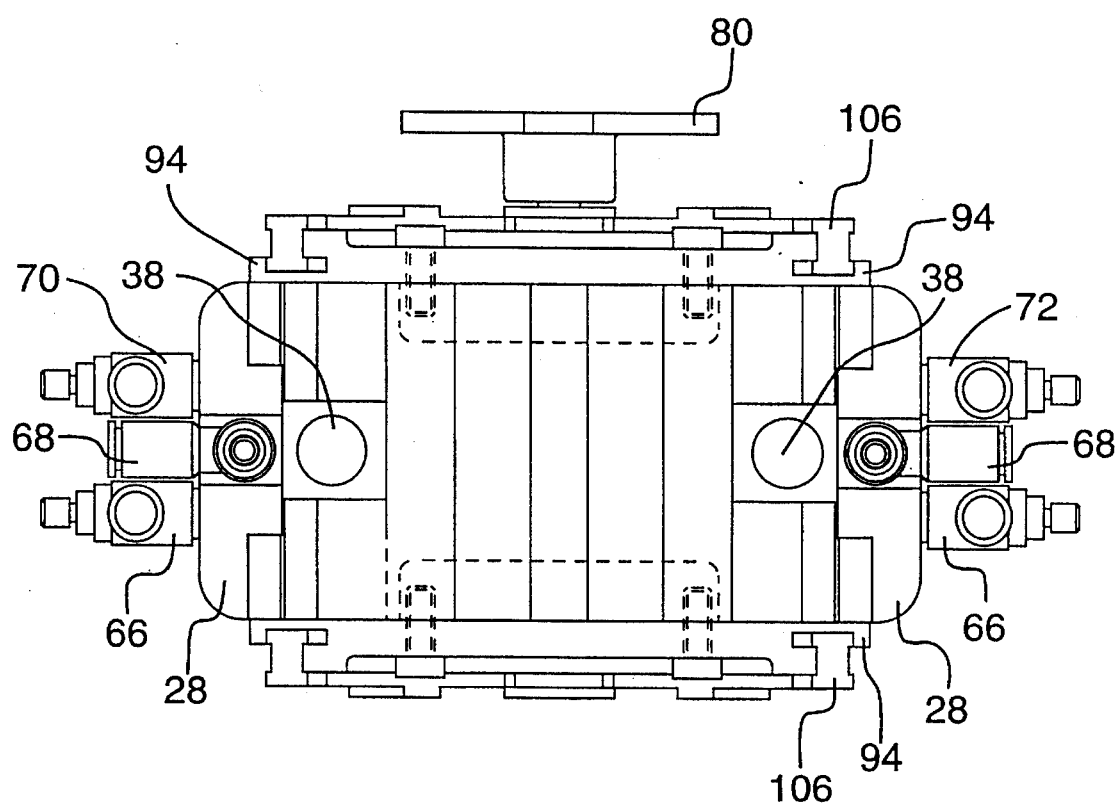
FIG. 6 is a bottom view of the first embodiment of the gripper module.
Figure 7:
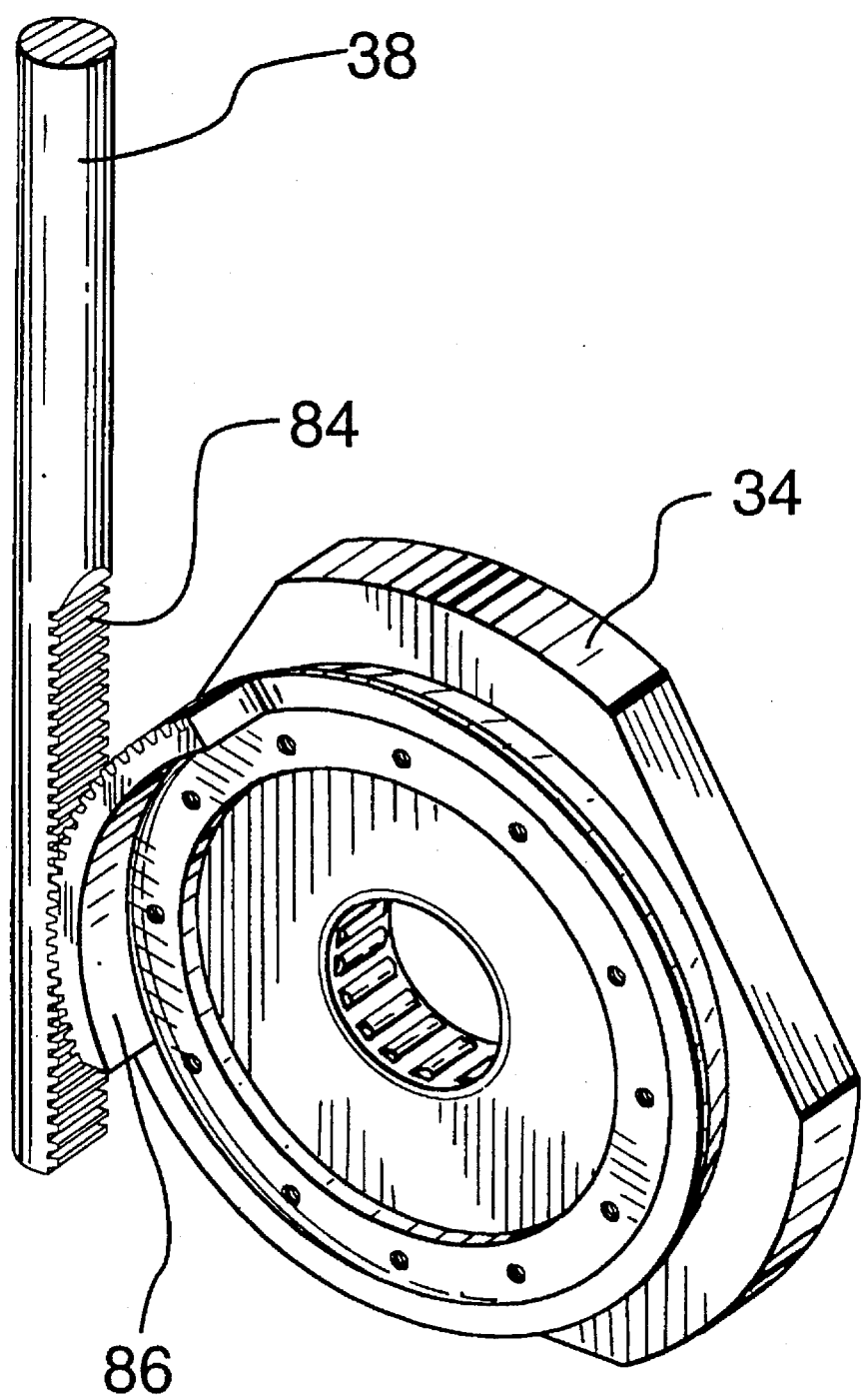
FIG. 7 is a perspective view of a back face of one of the rotors, and also illustrating a gear segment attached to the rotor and a rod with teeth engaging the gear segment.

Cut into one side of each of the rods 38 is a set of teeth 84, as illustrated in FIG. 7. Each set of teeth 84 engages the teeth on an outer face of an arcuate gear segment 86 connected by six screws 88 to a respective one of the rotors 34. Each of the rotors 34 is rotatably mounted on a central shaft 90 by a respective annular bearing 92. The central shaft 90 has each of its ends mounted on a circular flange on the inner face of a respective circular slide plate 94 secured by a set of screws 96 to the body housing 28. The orientation of each slide plate 94 relative to body housing 28 is adjustable in 30° increments. As is shown in FIG. 1, each rotor 34 has a generally triangular shape defined by a circle from which three arc segments are removed. Each rotor 34 has three equiangularly-spaced cam wells 100, each adapted to house a cam follower 102, as illustrated in FIG. 4. Cam follower 102 is rotatable on a cam shaft 104 fixed to a respective slide member 106. Each slide member 106 slides within a complementary-shaped track defined by a parallel pair of lips 108 extending radially on slide plate 94. The three equiangularly-positioned slide members 106 are shown in FIG. 5. As seen in FIG. 4, the slide members move in tracks defined by lips 108. Each slide member 106 can be fitted with a finger assembly projecting outwardly from the module and from the slide members, i.e. generally in an axial direction, each finger assembly comprising a finger and a fitted insert in the finger which makes contact with a part being handled; the fitted insert is made from a material selected to ensure that the part is gripped securely but not damaged during its movement by module 15. The finger assemblies and inserts are not specifically illustrated in the drawings, since their configuration varies widely in accordance with the intended task, and since the finger assemblies are not ordinarily supplied with the module, but rather are added by the end user. The module provides the slide members which move inwardly and outwardly, and it is normally left up to the end user to design and attach whatever finger assembly configurations are desired, to use the inward and outward movement of the slide members for gripping purposes. The module might be constructed with other than three cam followers, slide members and finger assemblies; there could be two, for example, or virtually any desirable number greater than three, subject to obvious space limitations depending on the overall size of the module.

Pusher plate 80 is secured by a shoulder screw 110, a polyurethane bushing 111, and a retaining ring 112 to a shaft 113 rotatably mounted in a flange bearing 114 in the slide plate 94. The internal end of shaft 113 is connected to a piston 116, which is spaced from a surrounding annular bearing 92 by a circumferential O-ring 117 and is biased by a compression spring 118 to normally remain in abutment with the end of cylinder 78. Air introduced into cylinder 78, through tube 76 and flow control valve 72, forces the pusher plate 80 to move outwardly against the bias of compression spring 118. Air is continuously introduced into central cavity 32 through flow channel 74 and flow control valve 70, and bled from that cavity by a series of bleed holes (not shown) in order to maintain the pressure in that cavity at approximately two atmospheres; this level of internal pressure ensures that dust or other particles does not enter within module 15.

The operation of robotic gripper module 15 proceeds as follows. Arm 16 brings that side of module 15 that has the pusher plate 80 close to the part to be grasped. The rod 38 which is in geared relationship with the rotor 34 on that side of module 15 is at this time in its topmost position. The module 15 is then manipulated by arm 16 until the capturable portion of the part is intermediate the finger assemblies on the three slide members 106. At that point the air pressure on the upper face of the associated piston 36 is increased, and that piston moves downwardly; the associated flow control valve 68 regulates the flow of the exhausted air, ensuring a smooth motion for piston 36. As the rod 38 moves down, the associated rotor 34 rotates. The three cam followers 102, which are constrained to radial motion on slide plate 94, move along their respective cam wells 100 as rotor 34 is rotated relative to slide plate 94. In the result, the three slide members 106 attached to the cam followers 102 move radially inward on slide plate 94, and the finger assemblies on the slide members 106 grasp the part being handled.

The grasped part may then be moved to a workstation, such as a lathe, by manipulation of arm 16. Once the part has been loosely inserted into a machine at the workstation and the finger assemblies have released the part, the air pressure at valve 72 may be increased to move pusher plate 80 outwardly to press the part into the machine.

While the grasped part is being machined or otherwise acted on, the arm 16 rotates module 15 through 180° such that the other side of module 15 is ready to remove the part from the machine; each side of module 15 is controlled independently through a separate air source. Each of the three slide members 106 on the other side of module 15 has a finger assembly attached which is compatible with the shape of the machined part. The three slide members 106 are maintained in their radially-outward positions as that side of the module is brought into abutment with the finished part. Once the part is sitting intermediate the three slide members 106, the rod 38 of the associated rotor 34 is driven downward to move the slides radially inward to grasp the part. The part is then moved to either a storage location or a location from which it can be collected for a further operation. The slide members 106 are moved radially outward to release the part, and the arm 16 then rotates the module 15 back through 180° such that the side of module 15 having pusher plate 80 is ready to grasp a new part to repeat the foregoing process.

Although a double-sided gripper module has been described, it is possible to construct a single-sided gripper module that works in a similar way. Since only one side of the gripper module has a set of gripper assemblies, in this construction each of the arcuate gear segments 86 is connected to an opposite side of a single rotor 34. Since the rods 38 are positioned intermediate of the rotors 34 on the double-sided version of the gripper module, the same body housing 28 may be used in constructing the single-sided version. In the single-sided gripper module, movement of one of the pistons 36 in one direction automatically causes the other piston 36 to move in the opposite direction. One of the pistons 36 is used to move the slide members 106 radially inward, while the other piston 36 is used to move them radially outward. Unlike with the double-sided gripper module, a single-sided gripper module does not require a controlled exhaust of air from the pistons.

As previously mentioned, a pusher plate is not always required on the gripper module; its inclusion will depend on the particular application.

The gripper modules described above, whether double-sided or single-sided, may be used alone or may be used in a series to construct an entire automated assembly line to make highly repetitive or hazardous work easier, safer and more cost-effective.

I claim:

1. A robotic gripper module comprising:

(a) a frame adapted to be fitted to an end of a robotic arm or to other support means;

(b) a rotor rotatably mounted on the frame and bearing a series of equiangularly-spaced first slots each extending at an angle to a radius of the axis of rotation;

(c) at least two cam followers mounted one each on radially-movable slide members to which finger assemblies may be attached, each cam follower being constrained to move in a respective first slot and also in a respective one of a series of second slots in the frame, each second slot extending radially from a point on the frame that corresponds with the rotational axis of the rotor, rotation of the rotor thereby resulting in the cam followers and slide members moving uniformly either toward or away from each other;

(d) a first rod extending parallel to a face of the rotor proximate one outer circumferential edge of the rotor, and being in positive engagement with said outer circumferential edge of the rotor such that axial movement of the first rod results in rotation of the rotor; and, (e) a first actuator positioned outside of the periphery of the rotor, the first actuator creating the axial movement of the first rod;

whereby actuation of the first actuator results in rotation of the rotor and in radial movement of the cam followers and slide members to which finger assemblies may be attached.

2. A robotic gripper module as in claim 1, wherein the rod has a gear rack that engages a gear segment extending on the face of the rotor.

3. A robotic gripper module as in claim 1, wherein the actuator is a pneumatic piston-and-cylinder.

4. A robotic gripper module as in claim 1, wherein there are two said cam followers and slide members.

5. A robotic gripper module as in claim 1, wherein there are three said cam followers and slide members.

6. A robotic gripper module as in claim 1, further comprising:

(f) a second rod extending parallel to the first rod and positioned proximate a diametrically-opposite edge of the rotor from the first rod, the second rod also being in positive engagement with the rotor such that axial movement of the second rod results in rotation of the rotor; and (g) a second actuator positioned outside of the periphery of the rotor, the second actuator creating the axial movement of the second rod;

whereby actuation of the second actuator also results in rotation of the rotor and in radial movement of the cam followers and slide members.

7. A robotic gripper module as in claim 6, wherein each first actuator and each second actuator is a pneumatic piston-and-cylinder.

8. A robotic gripper module comprising:

(a) a frame adapted to be fitted to an end of a robotic arm or to other support means;

(b) a pair of rotors rotatably mounted on the frame so as to extend in parallel on opposite sides of the frame, each rotor being rotatable on a respective axis and bearing a series of equiangularly-spaced first slots each extending at an angle to a radius of the respective axis;

(c) at least two cam followers mounted one each on radially-movable slide members to which finger assemblies may be attached, each cam follower being constrained to move in a respective first slot and also in a respective one of a series of second slots in the frame, each second slot extending radially from a point on the frame that corresponds with the rotational axis of a respective one of the rotors, rotation of a rotor thereby resulting in the cam followers and slide members moving uniformly either toward or away from each other;

(d) a pair of rods, each extending into an opposite slide of the space between the rotors, each rod being in positive engagement with a respective one of the rotors such that axial movement of a rod results in rotation of the respective rotor; and, (e) a pair of actuators, each being positioned outside of the space between the rotors and actuating a respective one of the rods;

whereby actuation of one of the actuators results in rotation of the rotor associated with that module, and in radial movement of the cam followers and slide members associated with that rotor.

9. A robotic gripper module as in claim 8, wherein the rotors are rotatable on a common axis.

10. A robotic gripper module as in claim 8, wherein each rod is positioned approximately equidistant from both rotors.

11. A robotic gripper module as in claim 8, wherein the width of each actuator module is approximately equal to the distance between an outer face of one rotor and an outer face of the other rotor.

12. A robotic gripper module as in claim 8, wherein each rod has a gear rack that engages a gear segment that extends on an inner face of the respective one of the rotors.

13. A robotic gripper module as in claim 8, wherein each actuator is a pneumatic piston-and-cylinder.

14. A robotic gripper module as in claim 8, wherein two cam followers are associated with each rotor.

15. A robotic gripper module as in claim 8, wherein three cam followers are associated with each rotor.

16. A robotic gripper module comprising:

(a) a frame adapted to be fitted to an end of a robotic arm or to other support means;

(b) a pair of pneumatic cylinders mounted on the frame, each cylinder having a piston mounted therein;

(c) a rod connected to each piston;

(d) a pair of rotors rotatably mounted on a common shaft on the frame so as to extend in parallel on opposite sides of the frame, a cylindrical region being thereby defined between the rotors, each rod extending into a respective opposite side of the cylindrical region and being positioned approximately equidistant from both rotors, each rod having a surface in positive engagement with a surface on an arcuate extension of a respective rotor, each rotor having a series of equiangularly-spaced first slots each extending at an angle to a radius of the shaft; and, (e) at least two cam followers mounted one each on radially-movable slide members to which finger assemblies may be attached, each of the cam followers being constrained to move in an associated first slot and also being constrained to move in one of a series of second slots extending on the frame radially from the shaft, rotation of a rotor thereby resulting in the cam followers and slide members associated with that rotor moving uniformly either toward or away from each other;

whereby pneumatic actuation of a piston results in rotation of the rotor associated with that piston, and in radial movement of the cam followers and slide members associated with that rotor.

17. A robotic gripper module as in claim 16, wherein the width of each pneumatic cylinder is approximately equal to the distance between an outer face of one rotor and an outer face of the other rotor.

18. A robotic gripper module as in claim 16, wherein each rod has a gear rack that engages a series of teeth on the arcuate extension of the respective one of the rotors.

19. A robotic gripper module as in claim 16, wherein two cam followers are associated with each rotor.

20. A robotic gripper module as in claim 16, wherein three cam followers are associated with each rotor.

* * * * *